United States Patent [19]

Degen et al.

[11] Patent Number: 4,493,756
[45] Date of Patent: Jan. 15, 1985

[54] PROCESS FOR CLEANING METAL FILTERS

[75] Inventors: Peter J. Degen, Huntington; Thomas C. Gsell, Sea Cliff, both of N.Y.

[73] Assignee: Pall Corporation, Glen Cove, N.Y.

[21] Appl. No.: 506,364

[22] Filed: Jun. 21, 1983

[51] Int. Cl.$^3$ .............................. C25F 1/00; C25F 1/06
[52] U.S. Cl. .............................. 204/141.5; 204/145 R
[58] Field of Search .................. 204/141.5, 144, 144.5, 204/145 R, 145 F

[56] References Cited

U.S. PATENT DOCUMENTS

| 725,345 | 4/1903 | Kitsee | 204/145 R |
| 3,219,520 | 11/1965 | Box | 204/141.5 |
| 3,823,080 | 7/1974 | Speigel | 204/141.5 |

FOREIGN PATENT DOCUMENTS

| 1044963 | 10/1966 | United Kingdom | 204/145 R |
| 1089458 | 11/1967 | United Kingdom | 204/141.5 |

OTHER PUBLICATIONS

8th Edition: "Acid Cleaning of Iron and Steel", pp. 340-346.
"Pickling of Iron and Steel", pp. 68-82, 346-356.
9th Edition: "Acid Cleaning of Iron and Steel", pp. 59-67.

Primary Examiner—Thomas Tufariello
Attorney, Agent, or Firm—Leydig, Voit, Osann, Mayer and Holt

[57] ABSTRACT

A process for cleaning porous metal filters, particularly stainless steel filters, comprising the steps of:
(1) electrolyzing the filter in an electrolyte bath using the filter as one of the electrodes, preferably as the cathode of the electrolytic system, and subjecting the system to an imposed or applied current, highly preferably a DC current; and
(2) rinsing the filter to remove electrolytic solution from the filter and flush any residual contaminants from the filter.

When organic material is to be removed, a baking step prior to the electrolysis step is used.

26 Claims, No Drawings

PROCESS FOR CLEANING METAL FILTERS

TECHNICAL FIELD

This invention relates to a process for cleaning metal filters. More particularly, this invention is directed to a process for cleaning porous stainless steel filters by electrolysis.

BACKGROUND ART

Metal filters, such as porous stainless steel filters, have found use in a variety of processes where high pressure drops are encountered and in applications where fine filtration capability must be combined with mechanical strength, resistance to high temperatures and/or resistance to chemical attack.

An example of an application for porous stainless steel filters is the filtration of fine catalysts used in fluid catalytic cracking processes in the petroleum industry. Temperatures as high as several hundred degrees Fahrenheit may be encountered by the filters used in such processes. The catalysts being filtered include various oxides such as silica, alumina, magnesia, zirconia and the like as well as molecular sieves. When these materials plug the pores of a fine-pored filter, they are very difficult to remove by conventional means such as back-flushing.

Porous stainless steel filters have also found wide acceptance in the manufacture of high fidelity magnetic recording tapes which use various magnetic materials, such as iron oxide or chromium oxide in conjunction with various binder resins. In this application, the filters ultimately become plugged with a mixture of (1) organic material, i.e., the binder resins present in the compositions being filtered, and (2) metal oxide(s). Again, removal of these materials by conventional means is very difficult.

Still another use of such filters is in the filtration of the resin streams used in the manufacture of polymers as, for example, polyesters. Typically, in such applications a high temperature feed stream of a monomer containing a catalyst must be filtered, ultimately leading to the plugging of the filter with a crosslinked gelled material which renders cleaning of the filter very difficult.

Since porous metal filters such as those used in the processes described above are quite expensive, e.g., on the order of 100 times as expensive as comparable sized conventional filters utilizing cellulosic fibers or the like, there is tremendous incentive to clean these filters and return them to use as opposed to simply replacing them at considerable expense. In spite of this incentive, prior to this invention there has, for the most part, not been a really satisfactory method for cleaning such filters and returning them to operation. This invention, then is directed to a process for cleaning such filters and, indeed, a process which, when operated in the optimum manner, can clean them so effectively that, for the most part, they are comparable to new filters of the same design.

DISCLOSURE OF THE INVENTION

The subject invention is directed to a process for cleaning porous metal filters, such as porous stainless steel filters, comprising, in each case, the step of electrolyzing the filter in an electrolytic system subjected to an imposed or applied current using the metal filter as an electrode in the system.

When cleaning porous metal filters which have become plugged with a composition containing organic material, the electrolysis step described above is preceded by a baking step at an elevated temperature to pyrolyze the organic material in the filter. Additionally, after the electrolysis step, the filter is rinsed to remove electrolyte from the filter and flush residual contaminants from the filter. Preferably, the filter is then treated with an aqueousbased acid composition, preferably nitric acid, to oxidize and dissolve any trace residual contaminants, as well as to brighten the filter. The filter is then again rinsed to remove the acid from the filter. In addition, depending upon the nature of the electrolyte used, an alkaline wash step and second rinse step may be conducted prior to the acid wash step.

A preferred process of this invention comprises five steps:

(1) baking the filter at an elevated temperature to pyrolyze any organic material in the filter;
(2) electrolyzing the filter in an electrolytic system using the filter as the cathode in the electrolytic system and subjecting the system to an imposed or applied DC current;
(3) rinsing the filter to remove electrolyte from the filter and flush any residual contaminants from the filter;
(4) treating the filter with an acid to oxidize and dissolve any trace residual contaminants, as well as brighten the filter; and
(5) rinsing the filter to remove acid from the filter.

BEST MODE FOR CARRYING OUT THE INVENTION

As described above, the subject invention is directed to a process for cleaning porous metal filters comprising an electrolysis step. In the subject invention the cleaning process encompasses or comprises at least steps (2) and (3) set out above in the preferred five step process described above under "Disclosure Of The Invention". That is, in each case the filter is subjected to an electrolysis step followed by rinsing of the filter to remove electrolyte from the filter and flush residual contaminants from the filter.

When a filter which is being cleaned has been in contact with organic material, i.e., used to filter a composition which includes organic material, the process of the subject invention includes a step prior to the electrolysis step of baking the filter at an elevated temperature to pyrolyze the organic material (step (1) in the five step process described above).

Additionally, whether or not a baking step is used, the filter, after having been rinsed to remove the electrolyte and flush residual contaminants from the filter (step (3) above), is preferably thereafter treated with an aqueous based acid composition to oxidize and dissolve any trace residual contaminants as well as to brighten the filter (step (4) above) and the filter is rinsed again, but this time to remove the acid from the filter (step (5)).

In the description set out below, the five steps described above will be further expanded upon to more specifically describe preferred conditions.

Step (1)—Baking Of The Filter:

When this step is used, i.e., when organic material is present or suspected of being present in the dirty filter, the filter is heated to an elevated temperature, typically in the range of from about 600 to about 900 degrees F. (Fahrenheit) for a period of from about 60 to about 180 minutes to pyrolyze any organic material in the filter. More preferably, the baking is carried out at a temperature of from about 650 to about 800 degrees F. for a period of from about 100 to about 140 minutes. When a porous stainless steel filter which has been used to filter high molecular weight resins is being cleaned, a baking period of about 120 minutes at about 700 degrees F. is particularly preferred.

This process step may be carried out in a conventional industrial oven, preferably in a hood or the like, to draw off volatiles formed during the baking step. The time and temperatures set out above, while believed to cover the operable ranges, may, particularly in the case of time, be extended. However, additional baking time beyond 180 minutes is not believed productive. Conversely, it is not believed harmful. Lower temperatures require longer baking times; higher temperatures may adversely affect the metal filter depending on the particular metal or metal alloy. For example, some stainless steel alloy filters begin to be adversely affected by exposure to a temperature of about 1,000 degrees F. or higher. Such temperatures should be avoided.

Step (2)—Electrolysis Of The Filter:

The electrolysis of the porous metal filter is carried out by immersing the filter (preferably completely since all porous surfaces of the filter will ultimately have to be immersed for complete treatment) in an electrolytic bath, typically for a period of from about 5 to about 60 minutes, using the filter as an electrode of the electrolytic system and subjecting the system to an imposed or applied current typically of from about 150 or about 450 amperes per square foot of filter surface. The use of an imposed or applied DC (direct current) current with the metal filter serving as the cathode of the electrolytic system is highly preferred. As used herein, the term "cathode" has the meaning ascribed to it in the context of electrolysis (rather than that of a battery). That is, the cathode is the negative electrode or the electrode having a negative field at which chemical reduction occurs. Some success at cleaning metal filters with an imposed or applied AC (alternating current) current has been achieved. However, in general, the time required to effect cleaning is increased, the process is harder to control, typically cleaning is not as thorough, and extended exposure of a metal filter in an electrolytic bath will result in dissolution of the metal structure, leading to a change in the properties of the filter, e.g., a lower pore rating (larger pores) due to removal of metal from the pore surfaces or even destruction of the filter. For these reasons the use of an imposed or applied DC current is highly preferred.

With reference to filter surface area, as used herein, particularly in the context of the imposed or applied current, by "square foot of filter surface" is meant the gross surface area on one side of the filter, i.e., the internal surface area of the pores is not included. In conventional cylindrical porous stainless steel filters, this means the gross surface area of the external cylindrical surface of the filter determined by measuring the circumference of the filter and multiplying this value by the length of the filter.

The choice of electrolyte will depend largely upon the nature of the material with which the filter was in contact prior to the cleaning process. In many situations, an alkaline-based electrolyte, e.g., KOH in water, will be quite suitable. Preferred alkaline-type ionizable materials for use in the preparation of alkaline-based electrolytes include $Na_2CO_3$, $Na_2HPO_4$, $Na_3PO_4$, $K_2HPO_4$, NaOH and KOH. Most preferred are NaOH and KOH, with the former most preferred. Concentrations of the alkaline material in the electrolyte may lie within the range of from about 20 to about 75 percent by weight. When NaOH is employed, a concentration of about 50 percent by weight NaOH in water is particularly preferred, although compositions ranging from about 30 to about 65 percent by weight NaOH have been found satisfactory. Other concentrations of NaOH may also be used although it has been found that a concentration of about 16 percent by weight NaOH is substantially less effective than concentrations within the preferred range of about 30 to about 65 percent.

In some instances in which an organic material has been filtered, foaming during electrolysis has been observed. This foaming appears to originate in the vicinity of the electrodes. An explanation which could account for this phenomenon, although others may also be propounded, is the formation of a surface active agent such as a soap formed by alkaline hydrolysis or saponification of oleaginous organic material. The resulting foam or froth is undesirable in large scale practice of this invention since hydrogen formed during electrolysis may be trapped in the foam or froth and build up to dangerous levels, thereby constituting an explosion hazard.

In attempting to overcome this drawback, it was found that an acidic electrolyte not only eliminated the foaming problem but also demonstrated good cleaning in the electrolysis step. Non-oxidizing acids, such as phosphoric acid, are preferred because of their reduced tendency to interfere with reactions occurring at the cathode (metal filter). Acids such as sulfuric and hydrochloric tend to attack stainless steel and are therefore undesirable when cleaning porous stainless steel metal filters. Acids such as formic and acetic are volatile and their overpowering odors subject workers to an unpleasant and potentially harmful environment. Nitric acid, which is undesirable because it is an oxidizing acid, also releases toxic oxides of nitrogen, such as $NO_2$.

A suitable concentration range for the acid is about 60 to about 90 percent by weight, or the highest concentration in which the acid is commercially available. When phosphoric acid is employed, the preferred concentration range is about 60 to about 85 percent by weight with a concentration of about 70 percent by weight being most preferred.

The anode used in carrying out the process of this invention must meet certain criteria. It must, of course, be conductive and it must also not interfere with the cleaning process occurring during the electrolysis step. Accordingly, the anode should, in general, be either (1) inert under the conditions encountered, or (2) sacrificial in a non-interfering manner. With regard to (2), a carbon-based anode, particularly graphite or a graphite/amorphous carbon mixture, is highly preferred since, during the electrolytic cleaning operation, carbon dioxide gas is generated at the carbon-based sacrificial anode as the anode is consumed. The carbon dioxide gas exits the system and there is no transfer of metal or other contaminant to the cathode (metal filter) due to dissolution of the anode into the electrolyte. If the anode selected dissolves in the electrolyte under the conditions encountered, the likelihood of interference or disruption of the cleaning process, e.g., metal migration to the cathode (metal filter) is increased. For this reason, the use of an anode which dissolves in the electrolyte is preferably avoided. With regard to (1), an inert material, or a material which either has or forms a protective coating on the exterior surface of the electrode (anode) may be used. For example, in acid based electrolysis, a lead/lead oxide anode may be used since the lead oxide coating effectively precludes dissolution of the lead into the electrolyte. Because carbon-based anodes are relatively inexpensive, have the desired conductivity properties and do not interfere with the cleaning process, they are preferred.

The anode is preferably constructed and arranged in such a manner as to provide as uniform a treatment of the metal filter in the electrolytic system as possible. That is, the anode is preferably of a length sufficient to extend the full length of the filter and is preferably positioned in the electrolyte bath such that its surface closest to the filter is substantially equidistant from the closest surface of the filter. For example, when cleaning a single porous, cylindrical, stainless steel filter of about eighteen inches in length, a flat, graphite/amorphous carbon anode, also of about eighteen inches in length, about one-half inch thick and about six inches wide, has been found effective. Preferably, the eighteen inch filter is laid flat in the electrolyte bath and is completely immersed. The anode is preferably placed so that it rests on the bottom of the container on one of its one-half by eighteen inch sides with about four inches of its width submerged. It is positioned such that its long axis is parallel to the center line of the immersed filter and the distance between the anode and the filter is in the range of from about 1 to about 4 inches, most preferably about 2 inches. Sufficient room should be allowed between the electrodes to provide for circulation of electrolyte. However, as the distance increases, the voltage must be increased to maintain a comparable imposed or applied current and, hence, the minimum distance in keeping with adequate circulation of elctrolyte and flushing and cleaning of the metal filter is desired.

A portion of the carbon electrode is left exposed so that connection to the power source can be accomplished, e.g., by a metal alligator clamp, without risking metal contamination of the electrolyte bath by immersing the clamp in the bath. Correspondingly, connection of the cathode (metal filter) to the power source is preferably accomplished by using a connector of the same material of construction as the cathode, e.g., stainless steel, since a portion of the connector must be immersed in the electrolyte bath to accomplish the connection.

Other arrangements of the shapes and the positioning of the electrodes vis-a-vis one another are also contemplated. For instance, the porous metal filter may be flat or planar. Alternatively, the anode may be cylindrically shaped and fit over (without contacting) a smaller (in diameter) cylindrical porous metal filter element, thereby providing more uniform treatment of the filter element. As another alternative, the anode may have a convexo-concave shape (such as a half-cylinder), allowing the anode to be "wrapped around" a cylindrical metal filter element, thereby providing more uniform treatment. Also, two flat slabs of anode material may be positioned on opposite sides of the porous metal filter(s) being cleaned.

The power source can be any conventional system capable of providing the desired amperage at the desired voltage. Amperage levels of about 150 amperes or higher per square foot of filter surface, preferably at a voltage of about 10 volts, may be used for both alkaline-based and acid-based electrolyte systems. A preferred amperage range for both systems is from about 150 to about 450 amperes per square foot, operating for a period of from about 10 to 60 minutes in alkaline electrolyte solution and 30 to 45 minutes, preferably 30 minutes, in acid solution. Particularly preferred when cleaning porous stainless steel filters is an amperage level of about 330 amperes per square foot of filter surface at 10 volts operating in an alkaline electrolyte for a period of about 20 minutes. For a conventional metal filter of about 18.5 inches in length and about 1.5 inches in diameter, this constitutes an amperage load of about 200 amperes per filter piece. Other voltages, e.g., 6 to 15 may also be used. The optimal applied voltage is a compromise among such factors as safety, applied current, bath temperature, nature of electrolyte, and the distance between cathode and anode. For safety reasons, a low voltage is preferred. Some trial and error may be required to optimize a system for a particular filter configuration and particular contaminant. Basically, as discussed below, they should be selected to insure formation of hydrogen at the cathode (metal filter) at such a rate as to provide good cleaning action.

A preferred apparatus for supplying the externally applied DC current on a small scale basis is a Line Welder Aircraft 250, Code 7490 arc welder available from the Lincoln Arc Company. For larger scale operations, the porous metal filters (particularly cylindrical filters) can be immersed in the bath, e.g., by suspending them in a vertical position and aligning them with the distance between each adjacent filter in line being about 1 to 4 inches. The anode can then take the form, as in the small scale application, of a slab of graphite/amorphous carbon which is partially immersed in the bath on one of its edges with a portion exposed for connection to the power source and aligned such that the nearest surface of the slab is equidistant from the nearest surface of all of the aligned filters, again, preferably, at a distance as described above, i.e., in the range of 1 to 4 inches. For this type of operation, the power source may be, for example, a rectified AC solid state system capable of providing direct current at about 4,000 amperes.

In an alkaline electrolyte bath, electrolysis is preferably conducted at, or at least initiated at or close to, ambient temperatures. An acidic electrolyte bath is preferably maintained, however, at a temperature of between about 160 to about 190 degrees F., preferably 180 degrees F. In both types of bath, heat is generated and elevated temperatures result. In both types of bath elevated temperatures are acceptable. Since an elevated temperature is quickly reached in an acid electrolyte bath, elctrolysis using such a bath can be initiated at ambient conditions although, as noted, elevated temperatures are preferred.

The hydrogen generated at the cathode (metal filter) provides a cleaning action, particularly within the fine pores of the filter, and serves to expel contaminants from the pores of the filter. To further insure against metal transfer to the cathode (metal filter), the electrolysis step is preferably carried out in a container which will not contribute to such an undesirable result. For this reason, if a metal container is used it should preferably be lined (with rubber, plastic, glass or the like) to insure against such a result. Alternatively, of course, a plastic, glass or rubber container or the like may be used.

Step (3)—Rinsing Filter To Remove Electrolyte And Flush Residual Contaminating Material:

After completion of the electrolysis step, the filter is rinsed, preferably with water for at least 30 seconds, more preferably for a minute or more. Satisfactory results have been attained by connecting a water line to the filter to provide inside/out flow through the filter and using a 3 gallon per minute nozzle operating at a pressure of about 10 psi or greater. This treatment flushes the electrolyte from the pores of the filter and provides a cleaning action removing debris or contaminants, such as material which has sloughed off the surfaces of the pores of the filter but which has not been lifted out by the hydrogen generated during the electrolysis process. Other flow rates and pressures as well as other fluids may be used to rinse the filter both here and in step (5) as described below. Water is preferred as the rinse fluid for economy, ease of disposal and effectiveness.

As noted above, in some filter cleaning operations, the following steps (3a), (3b), (4) and (5) may not be required, in which event the filter, as rinsed in step (3), is ready for return to service. However, preferably, the following steps (4) and (5), and in some instances (3a) and (3b) as described below, are carried out prior to putting the filter back in service.

Step (3a)—Treating The Filter With An Aqueous Alkaline Solution:

In those instances in which an acidic solution is employed as the electrolyte during the electrolysis step, an alkaline treating step is preferably employed after the initial water rinse of step (3). Suitable for use as the alkaline solute are those substances enumerated above as materials suitable for use in the preparation of the alkaline electrolyte in step (2). Again, NaOH and KOH are the preferred alkaline materials, KOH being most preferred since there is less tendency to cause a darkening of the stainless steel filter which can occur when NaOH is employed. A suitable concentration of alkali in the rinse solution is about 40 to about 75 percent by weight, preferably 50 to 70 percent by weight. When KOH is employed, a concentration of about 55 percent by weight is most preferably employed. Optimum results are obtained when the alkaline bath is heated to a temperature which is at or, preferably, slightly below the boiling point of the solution. Thus, temperatures in the range of about 190 to about 260 degrees F. are preferred. The filter is immersed in the hot solution for a period of approximately 2 to 16 hours, the length of treatment depending on both the concentration of alkali and the temperature of the solution. When solutions are maintained at the lower end of the temperature range, longer immersion times are required. Although longer periods of immersion in the hot alkaline bath are effective, practical considerations, e.g., the total time required to carry out for the complete process, frequently dictate the use of a shorter period of time, e.g., 2 hours vis-a-vis 16 hours or longer.

Step (3b)—Rinsing Filter To Remove And To Flush Remaining Contaminating Material:

Although any technique capable of removing remaining contaminants is suitable, the procedure and conditions for flushing the filter in step (3) above are in most situations generally preferred in the rinse following the alkaline washing. A lower pressure differential across the filter is, however, permissible in this step (3b) since much of the particulate matter which clogged the pores of the filter has been removed. Flushing is preferably continued for a period of about 30 seconds to several minutes, more preferably about 1 minute.

Step (4)—Treating The Filter With An Aqueous-Based Acid Composition:

After step (3) above (and steps (3a) and 3(a) when used), the filter is preferably treated with an aqueous based oxidizing agent, preferably an oxidizing acid composition, most preferably nitric acid, to oxidize and dissolve any trace residual contaminants remaining on the filter as well as to brighten the filter. Nitric acid is preferred since it is an oxidizing acid and does not attack nor otherwise damage stainless steel filters and is believed to form a passive and protective oxide coating. Certain acids, such as hydrochloric and sulfuric acids, are unsatisfactory. With hydrochloric acid there are two problems: (1) chloride ions may be trapped in the stainless steel and degrade it, possibly by destroying the protective oxide coating, and (2) the requisite cleaning action is not attained. Sulfuric acid is corrosive to stainless steel and also does not provide the requisite cleaning action.

Preferably the acid treatment is carried out by immersing the porous metal filter in a bath of the acid. In the case of nitric acid, a concentration of about 15 to about 50 weight percent nitric acid in water is preferred, most preferably 25 percent by weight. When the acid washing is used subsequent to an alkaline electrolysis, the filter is preferably immersed in the bath for a period of from about 1 to about 16 hours at temperatures ranging from ambient up to about 150 degrees F. When this acid wash occurs several steps after an acid electrolysis, the filter is immersed in the bath for a much shorter time. In such an instance, the acid washing is preferably conducted for a period of from about 1 to about 5 minutes, more preferably about 3 minutes, preferably at a temperature of about 140 degrees to about 180 degrees F., more preferably 160 degrees F.

Step (5)—Rinsing The Filter To Remove Acid:

The washing step of step (5) is preferably conducted in the same manner and under the same conditions as the water rinsing step of step (3) is carried out. Other rinsing techniques may also be used, however, which provide a vigorous rinsing action to substantially completely remove the acid composition.

The subject invention finds particular use in the cleaning of porous stainless steel filters, commonly sintered or woven porous stainless steel, having pore sizes typically in the range of from about 1 to about 50 micrometers. These types of filters are available from Pall Corporation under the trademarks PSS®, REGIMESH® and SUPRAMESH®. Various stainless steel grades are used to prepare these materials, such as SS316 and SS300. The subject process is believed also applicable to other metal porous filters, such as bronze. With such filters, other acids may be necessary to avoid destroying the filters. For example, with bronze filters a non-oxidizing acid such as phosphoric acid should be used in the electrolysis step and rinseup with acid should be avoided.

The subject invention will be better understood by consideration of the following examples, which are provided for exemplary purposes:

EXAMPLE 1

A cylindrical, porous stainless steel filter element having a nominal pore rating of about 3 micrometers, a length of about 18.5 inches and an outside diameter of about 1.5 inches was found to have its pores filled with trapped particulate matter to the point where fluid could no longer flow through the filter at any measurable rate at conventional pressures. The particulate consisted mainly of about 3 parts chromium dioxide and 1 part polyurethane binder resin. The filter element was subjected to the following treatment:

(1) the filter element was heated for two hours at about 700 degrees F. in a conventional air ventilated oven;

(2) after cooling to ambient temperature, the element was connected electrically to a source of externally applied DC current, specifically the negative terminal of a Line Welder Aircraft 250, Code 7490, arc welder as referred to above, and was then immersed in a 50 weight percent aqueous sodium hydroxide electrolyte, at ambient temperature; a graphite slab about 18.5 inches in length, 6 inches wide and about one-half inch thick was partially immersed—to a depth of about 4 inches while resting on one of its 18 inch by one-half inch sides—in electrolyte, aligned with the longitudinal axis or center line of the filter element, and positioned such that one of its 6 by 18 inch sides was about 2 inches from the closest surface of the filter element; the graphite slab was connected to the positive terminal of the external direct current power supply and a current of about 330 amperes per square foot of filter medium (200 amperes for this filter element having an external surface area of about 0.6 ft$^2$) at about 10 volts was then applied to or imposed on the system; gases were observed evolving at both the filter element (cathode) and graphite slab (anode); electrolysis of the filter element was continued for about 20 minutes;

(3) the filter element was then rinsed with water to remove the electrolyte and to displace the loosened contaminant from the pores of the filter;

(4) the filter element was then immersed in a 25 weight percent nitric acid in water bath for about 2 hours; during this time the bath was held at a temperature of about 60 degrees C.;

(5) after removing the filter element from the nitric acid solution, filtered tap water was passed through the filter element to rinse residual acid from the filter and remove remaining trapped particulate contaminants from the pores of the element; the remaining contaminant was quickly dislodged from the pores of the filter at this point; the rinsed filter was then tested for cleanliness by passing filtered tap water through the filter element at a flow rate of about 10 gallons per minute per square foot of filter surface (actual flow rate was about 6 gpm) and comparing the pressure differential across the filter element with that of a clean (new) filter element measured under the same conditions; comparable pressure differentials were obtained indicating effective cleaning; additionally, the cleaned filter was comparable in appearance to the new filter.

EXAMPLES 2-8

In the following Examples 2-8, the same general method of Example 1 was used to clean filter elements of the same design configuration, construction and nominal pore rating as that of Example 1. The filter elements of Examples 2-8 were also contaminated prior to treatment in substantially the same manner as the contaminated filter of Example 1. The concentration of (1) the ionizable material in the electrolyte and of (2) the acid treating solution, the duration of (1) electrolysis and (2) the acid soak, and the pressure drop across the filter after cleaning are set out in Table I. Except as otherwise noted in Table I, conditions and procedures used were the same as in Example 1.

TABLE I

| Example[5] | Electrolysis[1] Concentration NaOH | Time | Acid Soak[2] Concentration HNO$_3$ | Time | Pressure Drop[3] psi | Clean[4] Yes/No |
|---|---|---|---|---|---|---|
| 2 | 25% | 30 min. | 25% | 2 hrs. | 1.8 | Yes |
| 3 | 50% | 20 min. | 25% | 2 hrs | 1.5 | Yes |
| 4 | 65% | 20 min. | 25% | 2 hrs. | 1.5 | Yes |
| 5 | 50% | 20 min. | 16% | 2 hrs. | 1.6 | Yes |
| 6 | 50% | 20 min. | 25% | 2 hrs. | 1.6 | Yes |
| 7 | 50% | 20 min. | 25% | 1 hr. | 1.4 | Yes |
| 8 | 50% | 20 min. | 50% | 1 hr. | 1.7 | Yes |

[1]200 amperes per element or 330 amperes per square foot.
[2]temperature = 60 degrees C.
[3]a pressure drop of less than or equal to 1.8 psi is considered clean
[4]the pressure drops obtained for the filter elements of Examples 2-8 after treatment are comparable to those obtained with new filters of the same design configuration, construction and nominal pore rating
[5]the filter elements of Examples 2-8 were baked at about 700 degrees F. for 120 minutes

EXAMPLE 9

A cylindrical, porous stainless steel filter element of the type described in Example 1 above and which had been used in the filtration of magnetic tape coatings was found to be substantially clogged with a combination of solid organic and inorganic material consisting primarily of about three parts chromium dioxide and about one part polyurethane resin binder. The filter element was subjected to the following treatment:

(1) the filter element was heated for 2 hours at about 700 degrees F. in a conventional air ventilated oven;

(2) after cooling to ambient temperature, the element was connected electrically to the negative terminal of a Line Welder Aircraft 250, Code 7490, arc welder and thereafter immersed in an aqueous phosphoric acid solution having an acid concentration of about 72 percent by weight; a graphite slab (with the same dimensions as that used in Example 1 and aligned in the same manner) was partially immersed in the phosphoric acid based electrolyte in the same manner as described in Example 1; the graphite electrode was connected to the positive terminal of the arc welder and a current of about 330 amperes per square foot of filter element was applied to or imposed on the system at about 10 volts for about 30 minutes; gases were observed evolving at both the filter element (cathode) and the graphite slab (anode) during the electrolysis;

(3) the filter element was then rinsed with water to remove the electrolyte and to displace the loosened contaminant from the pores of the filter;

(4) the filter element was then immersed in a 68 percent by weight potassium hydroxide in water bath for 2 hours; during this time, the bath was held at a temperature of about 194 degrees F.;

(5) after removal from the potassium hydroxide bath, the filter element was rinsed with water to remove the potassium hydroxide solution and to displace loosened contaminant from the pores of the filter element;

(6) the filter was then placed in a 25 weight percent nitric acid in water bath for a period of about 30 minutes; during this time the temperature of the bath was held at about 60 degrees C.;

(7) after removing the filter element from the acid, filtered tap water was passed through the element to remove substantially all residual nitric acid and to dislodge substantially all remaining contaminant from the pores of the filter; the cleaned filter was then compared to a new filter with respect to the pressure differential across the filter when water was passed through the filters at a flow rate of about 10 gallons per minute per square foot of filter surface; the cleaned filter was found to have a pressure drop comparable to that of the new filter signifying a clean filter; the appearance of the cleaned filter was also comparable to that of the new filter element.

EXAMPLES 10–13

In the following Examples 10–13, the general method of Example 9 was used to clean filter elements of the same construction, design configuration and nominal pore rating as that of Example 9. The filter elements of Examples 10 to 13 were also contaminated prior to treatment in substantially the same manner as the contaminated filter of Example 9. In Examples 10 to 13 the electrolyte comprises 72 percent by weight phosphoric acid in water and the electrolysis step was carried out for 30 minutes using the same imposed or applied current as in Example 9. The acid treatment or soak was carried out in each case for 30 minutes using a 25 percent by weight nitric acid in water solution. The alkaline treatment or soak was carried out using KOH in water at the concentrations specified in Table II.

TABLE II

| Example[3] | Alkaline Soak Concentration KOH | Time | Temp. | Pressure Drop[1] psid | Element Clean[2] Yes/No |
|---|---|---|---|---|---|
| Control[4] | | | | | |
| 10 | 56% | 16 hours | 194° F. | 1.3[4] | Yes |
| 11 | 56% | 16 hours | 212° F. | 1.3[4] | Yes |
| 12 | 68% | 2 hours | 194° F. | 1.4[4] | Yes |
| 13 | 56% | 8 hours | 250° F. | 1.4[4] | Yes |

[1]measured at 10 gallons per minute per ft[2] of filter surface (6 gpm per filter element)
[2]a pressure drop less than or equal to 1.8 psi is considered clean
[3]elements of Examples 10–13 were pyrolyzed at 700° F. for 120 minutes
[4]these pressure drops are comparable to those obtained with a new filter of the same construction, design configuration and pore rating The relatively low values of pressure differential obtained signify that the cleaning treatment was effective. Additionally, the appearance of each of the cleaned filters was also comparable to that of a new filter element.

In a similar manner contaminated metal filters have been effectively treated using an aqueous phosphoric acid electrolyte in which the concentration of the acid has ranged from 60 to 85 weight percent. At a concentration of about 50 weight percent, phosphoric acid cleaning effectiveness is reduced. Above 85 weight percent, e.g., at 90 weight percent, the increased resistance of the electrolyte necessitates higher voltages to obtain the same current, increasing power consumption and making the process less economical. For these reasons, the preferred range is from 60 to 85 weight percent when phosphoric acid is used.

Industrial Applicability

The process of the subject invention finds use in the cleaning of porous metal filters, particularly porous stainless steel filters which have become plugged or clogged with organic material, metal contaminants, other particulates and combinations of such materials. The process finds particular application in the cleaning of filters used in the filtering of compositions used in manufacturing magnetic tapes, polymers, such as polyesters, and in filtering catalysts used in fluid catalytic cracking processes and the like. Accordingly, the process of the subject invention finds particular industrial applicability in the magnetic tape manufacturing industry, the petroleum processing industry, and in the chemical industry.

We claim:

1. A process for cleaning a porous metal filter comprising electrolyzing said filter in an electrolytic system subjected to an imposed or applied current using said filter as an electrode of said system, and rinsing said filter to remove electrolyte and to flush any residual contaminants from said filter.

2. The process of claim 1 wherein said filter is electrolyzed in an alkaline electrolyte.

3. The process of claim 1 wherein said filter is electrolyzed in an acidic electrolyte.

4. The process of claim 1 wherein said imposed or applied current is a direct current and said porous metal filter is the cathode of said electrolytic system.

5. The process of claim 1 wherein said imposed or applied current is a direct current and said porous metal filter is the cathode of said electrolytic system and is comprised of stainless steel.

6. The process of claim 5 wherein said DC current is from about 150 to about 450 amperes per square foot of filter surface.

7. The process of claim 5 wherein said filter is electrolyzed in an alkaline electrolyte.

8. The process of claim 7 wherein said alkaline electrolyte is an aqueous solution of NaOH.

9. The process of claim 7 wherein said alkaline electrolyte is an aqueous solution of KOH.

10. The process of claim 7 wherein said alkaline electrolyte is comprised of from about 20 to about 75 percent by weight of an alkaline material and from about 80 to about 25 percent by weight water.

11. The process of claim 5 wherein said filter is electrolyzed in an acidic electrolyte.

12. The process of claim 11 wherein said acidic electrolyte solution comprises an aqueous solution of phosphoric acid.

13. The process of claim 12 wherein said acidic electrolyte is comprised of from about 60 to about 85 percent by weight of said phosphoric acid and from about 40 to about 15 percent by weight water.

14. The process of claim 11 wherein subsequent to the rinsing step to remove electrolyte, said process further comprises the sequential steps of treating said filter with an alkaline solution, rinsing said filter to remove the alkaline solution, treating said filter with an aqueous solution of an oxidizing acid, and rinsing said filter to remove said oxidizing acid solution.

15. The process of claim 14 wherein said oxidizing acid is nitric acid.

16. The process of claim 14 wherein said alkaline solution comprises a solution of KOH.

17. The process of claim 14 wherein said alkaline solution comprises a solution of NaOH.

18. The process of claim 5 wherein subsequent to the rinsing step to remove said electrolyte said filter is treated with an aqueous solution of an oxidizing acid followed by a further rinse step.

19. The process of claim 18 wherein said oxidizing acid is nitric acid.

20. The process of claim 19 wherein said alkaline solution comprises from about 40 to about 75 percent by weight of an alkaline substance and from about 60 to about 25 percent by weight water.

21. The process of claim 17 wherein said solution is comprised of from about 15 to about 50 percent by weight nitric acid and from about 85 to about 50 weight percent water.

22. The process of claim 5 wherein prior to the elctrolysis step said filter is subjected to baking at an elevated temperature to pyrolyze any organic material in said filter.

23. The process of claim 22 wherein said elevated temperature is in the range of from about 600 to about 900 degrees F.

24. The process of claim 22 wherein subsequent to the rinsing step to remove said electrolyte said filter is treated with an oxidizing acid followed by a further rinse step.

25. A process for cleaning a porous, stainless steel filter comprising: '(a) baking said filter at an elevated temperature in the range of from about 650 to about 800 degrees F. for a period of from about 100 to about 140 minutes to pyrolyze any organic material in said filter;
  (b) electrolyzing said filter in an electrolyte bath comprising from about 60 to about 85 percent by weight phosphoric acid and from about 40 to about 15 percent by weight water for a period of from about 30 to about 45 minutes by immersing said filter in said electrolyte bath and using said filter as the cathode of an electrolytic system, and subjecting said system to an imposed or applied DC current of from about 150 to about 450 amperes per square foot of filter surface;
  (c) subjecting said filter to a first rinse to remove electrolyte from said filter and to flush residual contaminants from said filter;
  (d) treating said filter with an aqueous-based alkaline solution comprising from about 50 to about 70 percent by weight KOH;
  (e) subjecting said filter to a second rinse to remove said alkaline solution and any residual contaminants from said filter;
  (f) treating said filter with an aqueous nitric acid solution containing from about 15 to about 50 weight percent nitric acid to oxidize and dissolve any trace residual contaminants and brighten said filter; and
  (g) rinsing said filter to remove said nitric acid from said filter.

26. A process for cleaning a porous, stainless steel filter comprising:
  (a) baking said filter at an elevated temperature in the range of from about 650 to about 800 degrees F. for a period of from about 100 to about 140 minutes to pyrolyze any organic material in said filter;
  (b) electrolyzing said filter in an electrolyte bath comprising from about 30 to about 65 percent by weight sodium hydroxide and from about 70 to about 35 percent by weight water for a period of from about 10 to about 60 minutes by immersing said filter in said electrolyte bath and using said filter as the cathode of an electrolytic system, and subjecting said system to an imposed or applied DC current of from about 150 to about 450 amperes per square foot of filter surface;
  (c) subjecting said filter to a first rinse to remove electrolyte from said filter and to flush residual contaminants from said filter;
  (d) treating said filter with an aqueous nitric acid solution containing from about 15 to about 50 weight percent nitric acid to oxidize and dissolve any trace residual contaminants and brighten said filter; and
  (e) rinsing said filter to remove said nitric acid from said filter.

* * * * *